United States Patent [19]

Seeber

[11] Patent Number: 4,772,076
[45] Date of Patent: Sep. 20, 1988

[54] UNDERCARRIAGE FOR MULTIPLE-AXLE, CROSS-COUNTRY VEHICLE

[76] Inventor: Fritz Seeber, 6731 Elmstein-Helmbach, Fed. Rep. of Germany

[21] Appl. No.: 64,204

[22] Filed: Jun. 18, 1987

[30] Foreign Application Priority Data

Jun. 24, 1986 [DE] Fed. Rep. of Germany ....... 3621137

[51] Int. Cl.$^4$ ...................... B62D 55/16; B62M 27/02
[52] U.S. Cl. .................................................. 305/31
[58] Field of Search .................. 305/29, 30, 31, 10, 305/15, 60; 180/24.02, 209, 9.5, 9.52, 9.54

[56] References Cited

U.S. PATENT DOCUMENTS

| | | | |
|---|---|---|---|
| 3,299,978 | 1/1967 | Sponsler | 180/9.52 |
| 3,447,620 | 6/1969 | Schoonover | 180/9.52 |

FOREIGN PATENT DOCUMENTS 96931  8/1960  Norway ........................... 180/24.02

Primary Examiner—James B. Marbert
Attorney, Agent, or Firm—Toren, McGeady & Associates

[57] ABSTRACT

In an undercarriage for a multiple-axle, cross-country vehicle, the connection between the vehicle chassis and a support member for the undercarriage is effected through a mechanism including tension member. The mechanism includes two parallel guides with an integrated hydraulic cylinder each. Each parallel guide has at its lower end a fork member in which an eccentric disk is eccentrically mounted. Each eccentric disk is connected to a drive disk, the center of the drive disk coinciding with a point on the eccentric disk located diametrically opposite the eccentric points. Also connected to the lower end of each parallel guide is a control disk. The two eccentric disks are coupled with each other through a first tension member. The control disks are coupled to the drive disk on the opposite parallel guide by means of a second member. When all structural components of the mechanism are correctly mounted relative to each other, the center points of the eccentric disks maintain the spacing between each other independently of the relative position of the parallel guides, so that the connection to the undercarriage support can be effected through simple pivot bearings. The undercarriage support can be divided into two parts with a roller-type connection between the two parts.

17 Claims, 3 Drawing Sheets

//  4,772,076

UNDERCARRIAGE FOR MULTIPLE-AXLE, CROSS-COUNTRY VEHICLE

BACKGROUND OF THE INVENTION

1. Field of the Invention

The present invention relates to a mechanism for transforming two parallel, rectilinear stroke-type movements into a combined pivoting and stroke movement and vice-versa. The mechanism is particularly used in undercarriages for multiple-axle, cross-country vehicles.

2. Description of the Prior Art

The present invention starts from a mechanism described in applicant's German Pat. No. 32 31 477. This prior art mechanism has the particular capability of transforming a circular movement into two always parallel linear movements. For this purpose, the known mechanism has two control disks which are rotatably mounted on a common kingpin. A rocker arm each is rigidly connected to each control disk. An eccentric disk each is centrally mounted on the end of each rocker arm. An endless tension means extends from each of the control disks to each of the eccentric disks. The eccentric disks each have an eccentric point which carries out a linear movement during any chosen swivel movement of the rocker arms, wherein the linear movement of the two eccentric points are always parallel relative to each other. Therefore, at these locations the eccentric disks can be connected by means of a pivot bearing each to a rigid rail which may serve, for example, as the undercarriage support for the wheels or the chain sprockets of a multiple-axle, cross-country vehicle. Conventional hydraulic cylinders can be used for adjusting the spacing between vehicle chassis and undercarriage as required by uneven ground conditions or positioning of the vehicle on a slope.

Due to the presence of the central control disks and the two rocker arms, the above-described known mechanism still required a relatively large amount of space. Particularly if the mechanism is used in vehicles, this may result in problems with respect to ground clearance. The aforementioned German Pat. No. 32 31 477 does offer solutions to these problems by suggesting the use of semi-circular disks with different radii, wherein the transmission ratio is equal, or by the exclusive use of partial disks. As a result, the problem concerning the ground clearance is reduced, but not eliminated. In addition, the known mechanism still has a relatively large number of moved masses. In addition, the entire weight of the vehicle must be absorbed by a single, central axle.

It is, therefore, the primary object of the present invention to provide a mechanism of the above-mentioned type which does not require a central kingpin, pivotable control disks and rocker arms, while still being capable in the same manner to transform two parallel, rectilinear stroke-type movements into a combined pivoting and stroke movement and vice-versa.

SUMMARY OF THE INVENTION

In accordance with the present invention, a mechanism for transforming two parallel, rectilinear stroke-type movements into a combined pivoting and stroke movement, and vice-versa, includes two parallel guide means, two eccentric disks each having at least a circular arc periphery portion, each eccentric disk defining a center point and an eccentric point, each eccentric disk connected to one of the parallel guide means at the eccentric point, two drive disks each having at least a circular arc periphery portion, each drive disk connected to one of the eccentric disks, the center of each drive disk coinciding with a point on the eccentric disk located diametrically opposite the eccentric point and equidistant from the center point as the eccentric point, two control disks each having at least a circular arc periphery portion, each control disk attached to one of the parallel guide means, two tension means, each tension means being wound onto and extending from the periphery of one of the control disks to the drive disk on the opposite parallel guide means, two pairs of pivot bearings on each eccentric disk, one of each pair of pivot bearings being located on the center point and the other on the eccentric point, wherein the pivot bearings in the center points always have the same spacing between each other.

The mechanism according to the invention has the advantage that the number of the moving parts and, thus, the moving masses are substantially reduced. When the mechanism is used in a cross-country vehicle, substantial ground clearance can be obtained. Since the central kingpin is now omitted, the parallel guide means must guide the mechanism relative to its housing, for example, the vehicle chassis; however, the parallel guide means must only absorb forces which act in direction of their longitudinal axes, while all force components of the mechanism acting perpendicularly on the longitudinal axes must be absorbed and neutralized by the tension means.

Due to the special arrangement of the mechanism, both eccentric disks carry out synchronous rotating movements. Thus, it is possible to connect both eccentric disks to a tension means, wherein this tension means is an endless envelope-type drive.

In accordance with an advantageous further development of the invention, the tension means connecting the control disks with the drive disks of the opposite parallel guide means are arranged to cross each other. In this manner, it is possible to arrange each control disk above the eccentric disk and the drive disk, as seen with respect to the earth's gravity; for example, additional ground clearance can be obtained as a result.

In accordance with a preferred further development of the invention, a rail can be mounted on the pivot bearing coinciding with the center points of the eccentric disks. This rail may have a centrally arranged roller-type connection. Thus, the rail is composed of two halves which each can be pivoted about its pivot bearing independently from the movement carried out at a given time by the parallel guide means or the eccentric disk and the drive disk. This roller-type connection can be provided only because all forces acting between the disks are absorbed and neutralized by the tension means.

As already mentioned above, the mechanism according to the present invention is preferably used in an undercarriage for multiple-axle, cross-country vehicles. On each side of the vehicle is mounted a rail serving as an undercarriage support for carrying the wheels. It is of no significance in this connection whether the undercarriage is used for wheels of a vehicle or for chain sprockets of a vehicle.

For adjusting the distance between undercarriage and chassis, vertical adjustment means are provided, particularly in the form of hydraulic cylinders. In accordance with a preferred further development of the invention, the hydraulic cylinders are integrated in the parallel guide means, so that the cylinder housings are guided in guide sleeves mounted in the chassis.

Since the parallel guide means, or the hydraulic cylinders integrated in the parallel guide means, absorb forces only in longitudinal direction and transmit forces to the chassis of the vehicle only in longitudinal direction, it is recommended to mount protective tubes on the chassis. The hydraulic cylinders are guided in the protective tubes and the piston rods are preferably mounted at the upper ends of the protective tubes. The protective tubes are subjected only to tensile stress; therefore, the tubes can have relatively thin walls.

Since, in a cross-country vehicle, the undercarriage supports on each side must be adjustable by a distance which is not too small, for example ±1 m, the parallel guide means and the protective tube must have an appropriate length. Thus, it is recommended to use these protective tubes simultaneously as part of a roll bar for the cross-country vehicle, so that the driver of the vehicle is protected in case of an accident.

In accordance with a further development of the invention, a fork member is provided at the lower end of each parallel guide means. The eccentric disk and the drive disk are mounted in the fork member. A control disk each is also mounted on this fork member.

As already mentioned, a rail can be mounted between the pivot bearings in the center of the eccentric disks which always have the same spacing between each other. This rail carries out the combined pivoting and stroke movement. This rail may have a central roller-type connection, wherein the pivot bearings are in the centers of the surfaces facing each other.

If used in an undercarriage of the cross-country vehicle, this roller-type connection must be soft with respect to bending, but stiff with respect to torsion, so that the rail can serve as a support for wheels. In order to make this possible, the surfaces of the roller-type connection may be toothed. In accordance with another embodiment, a coupling of the two parts is obtained by means of flexible belts mounted in crosswise manner.

To be able to adjust the angle defined between the two parts of the rail, the use of a hydraulic cylinder is recommended.

In accordance with an advantageous further development of the invention, the actual centers of rotation of the roller-type connection are offset upwardly and toward the roller-type connection relative to the ideal position which is exactly between two adjacent wheel axles. As a result, the wheel axles are pivoted asymmetrically depending upon the pivoting direction of the roller-type connection. In accordance with a preferred embodiment, the offset centers of rotation are recommended in an undercarriage which is constructed as a crawler-type or chain-type undercarriage with an endless chain extending over all wheels. This results in the advantage that, when a wheel axle at the end of the vehicle is raised, the upper portion of the chain remains taut, so that the danger of jumping of the chain from the wheels is decisively reduced. When the wheel axles at the end of the vehicle are lowered, the lower portion of the chain becomes slack to such an extent that the lower portion remains in contact with the wheels in the middle even when the vehicle drives over obstacles, hill tops or the like.

The various features of novelty which characterize the invention are pointed out with particularity in the claims annexed to and forming a part of this disclosure.

For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
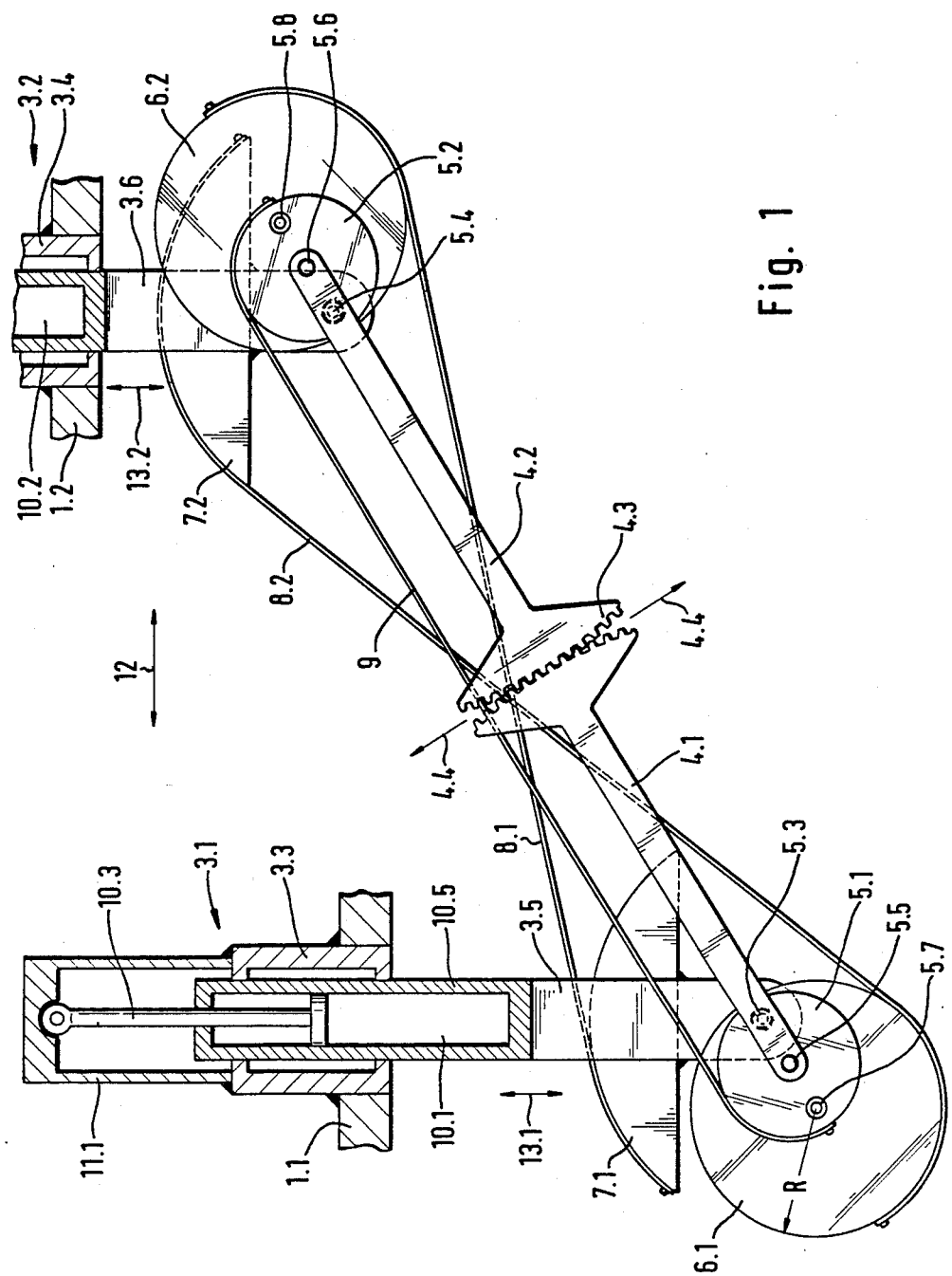
FIG. 1 is a schematic illustration of a mechanism including tension means for connecting a vehicle chassis and an undercarriage support.

FIG. 1 of the drawing shows a chassis 1 of a vehicle, wherein the chassis parts 1.1, 1.2 are shown, contrary to reality, at different height levels in order to be able to show more clearly the operation of the mechanism according to the present invention.

Attached to chassis 1 are guide sleeves 3.3, 3.4 of two parallel guide means 3.1, 3.2. Guide rods are guided in the guide sleeves 3.3, 3.4; in the present example, the guide rods are cylinders 10.1, 10.2 of a hydraulic cylinder 10 each. The hydraulic cylinders 10 have upwardly directed piston rods 10.3 which are supported at the upper end in a protective sleeve 11. Protective sleeve 11, in turn, is fastened to guide sleeve 3.1 or vehicle chassis 1. Since the protective sleeve 11 is only subjected to tensile stress, the wall of the protective sleeve 11 may be relatively thin.

Hydraulic medium is supplied to the hydraulic cylinders 10.1, 10.2 in the known manner through the piston rods 10.3. Hydraulic cylinders of this type are commercially available. The hydraulic cylinders 10.1, 10.2 are used to adjust the distance between chassis 1 and the undercarriage support 4 as desired and needed.

Fork members 3.5, 3.6 are mounted at the lower ends of the parallel guide means 3.1, 3.2 or the corresponding hydraulic cylinders 10.1, 10.2. The lower ends of fork members 3.5, 3.6 have axles on which an eccentric disk 5.1, 5.2 each is supported in an eccentric point 5.3, 5.4. The two eccentric disks 5.1, 5.2 are coupled to each other through a first tension means 9, the first tension means 9 being connected to the eccentric disks 5.1, 5.2 or being constructed as an endless envelope-type drive.

A drive disk 6.1, 6.2 each is connected to each eccentric disk 5.1, 5.2. The center point 5.7, 5.8 of the drive disk coincides with an opposing eccentric point of the eccentric disk 5.1, 5.2. This opposing eccentric point is located symmetrically to the eccentric point 5.3, 5.4 with respect to the center point 5.5, 5.6 of the eccentric disk 5.1, 5.2. Drive disks 6.1, 6.2 have a radius R which has a certain relationship with respect to the entire mechanism. However, radius R can initially be selected freely. Radius R is preferably selected in such a way that, upon rotation of the drive disks 6.1, 6.2 about the pivot bearing in the eccentric point 5.3, 5.4, the operation of the mechanism at the second tension means 8.1, 8.2 to be described later are not impeded.

A control disk 7.1, 7.2 each is rigidly connected to each of the parallel guide means 3.1, 3.2 or the fork members 3.5, 3.6. The second tension means 8.1, 8.2 extends from each control disk 7.1, 7.2 to the oppositely located drive disk 6.2, 6.1 to which it is also fastened. If the tension means 9, 8.1, 8.2 are constructed as chains and the disks 5.1, 5.2; 6.1, 6.2; 7.1, 7.2 are constructed as sprocket wheels, it may not be necessary to specially fasten the tension means.

When the two parallel guide means 3.1, 3.2 are moved upwardly and downwardly as indicated by arrows 13.1, 13.2, the second tension means 8.1, 8.2 are wound off from or wound onto the corresponding control disk 7.1, 7.2 depending upon the direction of movement. The respectively opposite drive disks 6.2, 6.1 and eccentric disks 5.2, 5.1 are thus rotated in one or the other direction, this rotation being transmitted synchronously to the other eccentric disk through the coupling effected by the first tension means 9. This coupling by means of the first tension means 9 has the result that the two eccentric disks 5.1, 5.2 must rotate synchronously and about their actual center points 5.5, 5.6. However, since the eccentric disks 5.1, 5.2 are mounted in the eccentric points 5.3, 5.4 eccentrically on the forks 3.5, 3.6, the angular positions between drive disk 6.1, 6.2 and parallel guide means 3.1, 3.2 must necessarily change. As a result of the change in the angular position, simultaneously the center points 5.7, 5.8 of the drive disks 6.1, 6.2 move on a circle about the eccentric points 5.3, 5.4 while the tension means 9, 8.1, 8.2 are wound on or off accordingly. The extent of the change is being controlled by the tension means 9, 8.1, 8.2.

The mechanism according to the invention can be dimensioned in such a way that in any position the center points 5.5, 5.6 of the eccentric disks 5.1, 5.2 always have the same mutual distance between each other. For this reason, it is possible to connect a rigid undercarriage support 4 by means of simple pivot bearings to the center points 5.5, 5.6 of the eccentric disks 5.1, 5.2. This undercarriage support 4 then carries out a combined pivoting and stroke movement.

As can be seen from FIG. 1, undercarriage support 4 can be divided into undercarriage support members 4.1, 4.2 at a central pivoting or roller-type connection 4.3. The ends of the support members 4.1, 4.2 which face each other can move as indicated by arrows 4.4. The centers of the roller-type connection 4.3 coincide with the center points 5.5, 5.6 of the eccentric disks 5.1, 5.2. This division of the undercarriage support 4 is only possible because all forces acting between the two parallel guide means 3.1, 3.2, i.e., all force components extending parallel to arrow 12, are absorbed and neutralized in the mechanism according to the invention by means of the tension means 8.1, 8.2, 9. This means that the guide sleeves 3.3, 3.4 of the parallel guide means 3.1, 3.2 are not stressed by forces extending parallel to arrow 12 resulting from the mechanism and its operation. Accordingly, the parallel guide means 3.1, 3.2 operate with small forces and low friction.

Only that portion of all disks 5.1, 5.2, 6.1, 6.2, 7.1, 7.2 must be provided which is required for guiding the tension means 8.1, 8.2, 9. In practice, the diameters of the drive and eccentric disks 6.1, 6.2; 5.1, 5.2 can be selected relatively small. As a result, a relatively great ground clearance is possible. The tension means 8.1, 8.2, 9 can themselves be mounted behind suitable protective sheathing.

Figure 2:
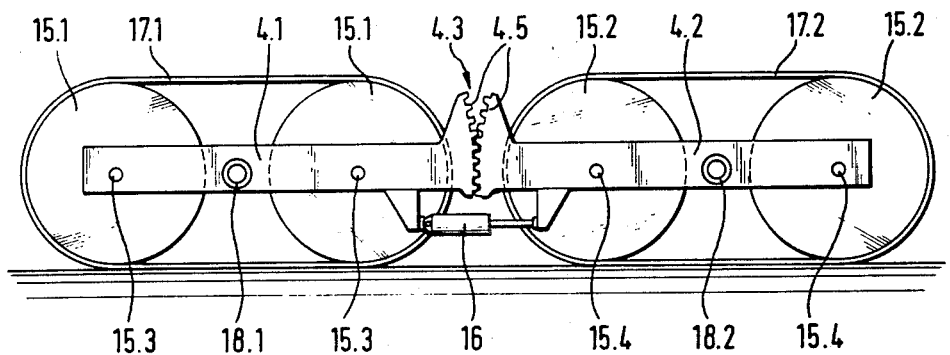
FIG. 2 is a schematic illustration of an undercarriage support divided in the center, with two chains extending over the wheels of each undercarriage support half.

FIG. 2 of the drawings shows the use of the mechanism according to the present invention in a crawler-type undercarriage. FIG. 2 shows the undercarriage support 4 which again is divided into two parts 4.1, 4.2 which are connected to each other through a roller-type connection 4.3. Two sprocket wheels 15.1, 15.2 each are fastened to each half 4.1, 4.2 of support 4. A chain 17.1, 17.2 each runs over the sprocket wheels of each half. A hydraulic cylinder 16 mounted in the region of roller-type connection 4.3 serves to adjust the angle between the two support members 4.1, 4.2 as desired.

As already mentioned above, simple pivot bearings 18.1, 18.2 are used for connecting the undercarriage support 4 and the center points 5.5, 5.6 of the eccentric disks 5.1, 5.2, the eccentric disks being shown only in FIG. 1. The pivot bearings 18.1, 18.2 are located exactly in the middle between two adjacent wheel axles 15.3 or 15.4.

Figure 3:
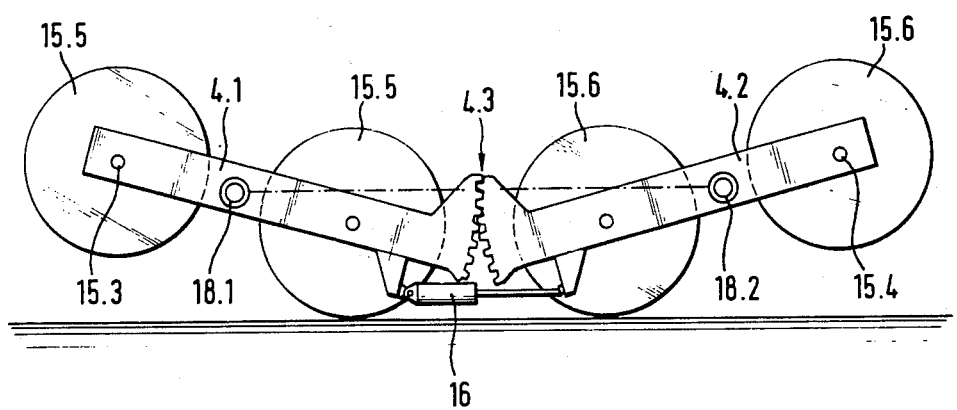
FIG. 3 is a schematic illustration of an undercarriage support of a wheeled vehicle, the undercarriage support being divided in the center, wherein the axles at the end of the vehicle are raised.

FIG. 3 shows the use of the mechanism according to the present invention in an undercarriage with wheels. Two wheels 15.5, 15.6 each are fastened to the two support halves 4.1, 4.2. As illustrated in FIG. 3, hydraulic cylinder 16 is extended so that the support members 4.1, 4.2 assume an angular position relative to each other, so that the axles at the ends 15.3, 15.4 are raised. In this position, driving over, for example, obstacles is facilitated; however, this position is particularly advantageous when driving through narrow curves if wheels 15.5, 15.6 cannot be steered. This is also applicable to the crawler-type undercarriage shown in FIG. 2 and particularly also for the crawler-type undercarriage still to be described with the aid of FIGS. 4 through 6.

Figure 4:
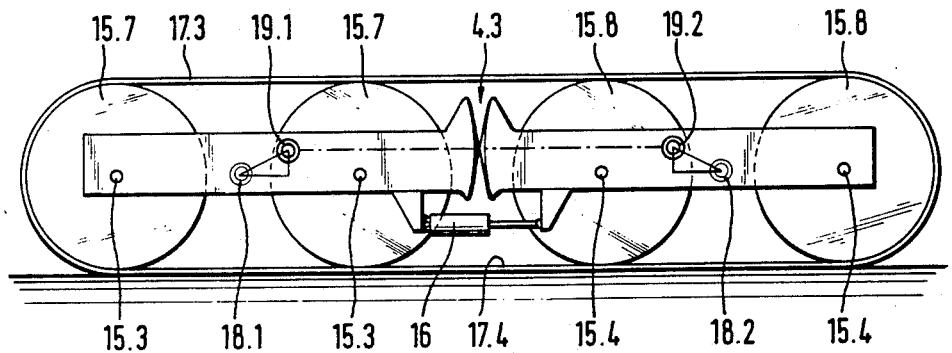
FIG. 4 is a schematic illustration of an undercarriage support divided in the center, with a chain extending over all wheels.
Figure 5:
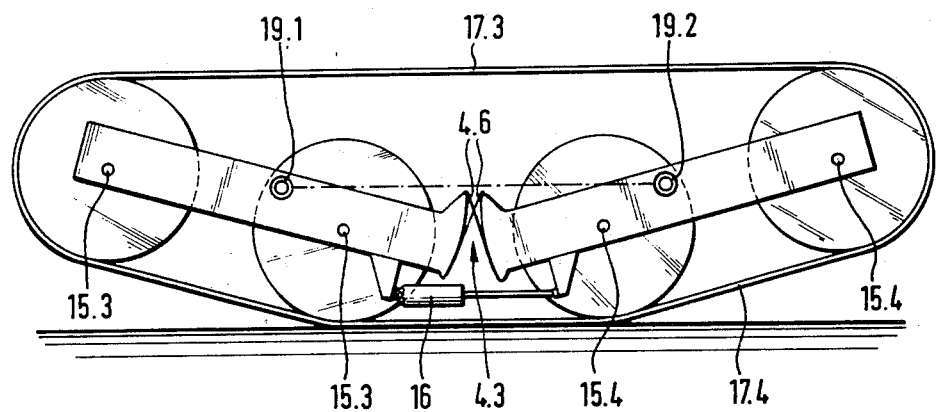
FIGS. 5 and 6 show the undercarriage support of FIG. 4 in different angular positions.
Figure 6:
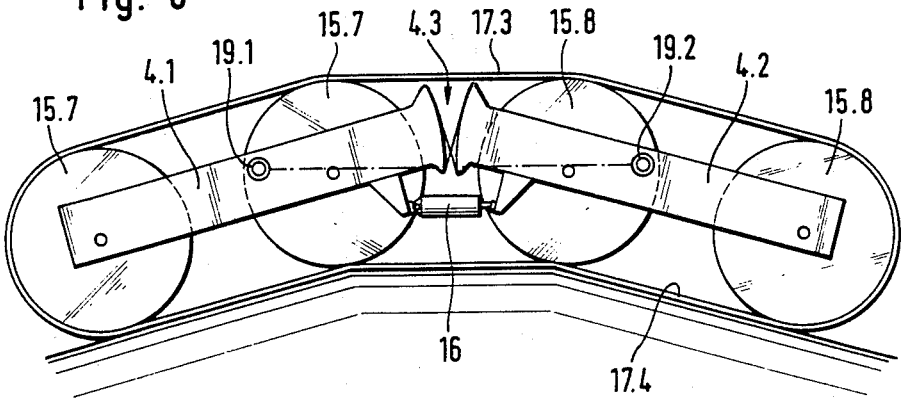

FIGS. 4 to 6 of the drawing show the use of the mechanism according to the present invention in an undercarriage in which a chain runs over all wheels, the chain having an upper portion 17.3 and a lower portion 17.4. In the illustrated example, pivot bearings 19.1, 19.2 effecting the connection between the center points 5.5, 5.6 of the eccentric disks 5.1, 5.2 are offset upwardly and toward the roller-type connection 4.3 as compared to the symmetrical position 18.1, 18.2 between the wheel axles 15.3, 15.4. Bearings 19.1, 19.2 simultaneously are the centers of rotation of the roller-type connection 4.3.

The effect of the offsetting of the bearing points shall now be explained with the aid of FIGS. 5 and 6.

As soon as the two outer ends of the support members 4.1, 4.2 are raised, a clearance between the upper portion 17.3 of the chain and the reels would occur if the bearing points are in the ideal position; this could cause the chain to jump from its guide. As a result of offsetting the bearing points 19.1, 19.2 as described above, the wheel axles 15.3, 15.4 are pivoted further downwardly, so that the chain remains taut if correctly adjusted.

In the position illustrated in FIG. 5, the vehicle only rests on the two middle wheels 15.7, 15.8, while the outer wheels do not have contact with the ground. This makes it possible to drive through narrow curves without problems and without damaging the ground below.

The opposite effect occurs, i.e., a clearance between lower portion 17.4 of the chain and the wheels may result, if the two support members 4.1, 4.2 are pivoted relative to each other in the opposite sense for driving over hills, so that the outer wheels are located lower than the inner wheels 15.7, 15.8. However, since when driving over hills the vehicle rests with its entire weight on the lower portion 17.4 of the chain, this lower portion is pressed against wheels 15.7, 15.8. No excess stress occurs on the chain even without providing a chain tension adjusting wheel. The chain is safely guided by all wheels. It is possible to drive over hills without problems.

While specific embodiments of the invention have been shown and described in detail to illustrate the application of the inventive principles, it will be understood that the invention may be embodied otherwise without departing from such principles.

I claim:

1. A mechanism for transforming two parallel, rectilinear stroke-type movements into a combined pivoting and stroke movement and vice-versa, comprising two oppositely spaced-apart parallel guide means, two eccentric disks each having at least a circular arc periphery portion, each eccentric disk defining a center point and an eccentric point, each eccentric disk connected to one of the parallel guide means at the eccentric points, two drive disks each having at least a circular arc periphery portion, each drive disk connected to one of the eccentric disks, the center of each drive disk coinciding with a point on the eccentric disk located diametrically opposite the eccentric point and equidistant from the center as the eccentric point, two control disks each having at least a circular arc periphery portion, each control disk attached to one of the parallel guide means, two tension means, each tension means being wound onto and extending from the periphery of one of the control disks to the drive disk on the opposite parallel guide means, and two pairs of pivot bearings on each eccentric disk, one of each pair of pivot bearings being located on the center points and the other on the eccentric points, wherein the pivot bearings in the center points always have the same spacing between each other.

2. The mechanism according to claim 1, comprising a third tension means for connecting the two eccentric disks.

3. The mechanism according to claim 2, wherein the third tension means is an endless envelope-type drive.

4. The mechanism according to claim 1, wherein the two tension means connecting the control disks to the drive disks on the opposite parallel guide means cross each other.

5. The mechanism according to claim 1, comprising a rail member attached to two pivot bearings coinciding with the center points of the eccentric disks, the rail member composed of two parts connected to each other through a centrally arranged roller-type connection.

6. An undercarriage for a multiple-axle, cross-country vehicle including a chassis, a rail member supporting wheels of the vehicle mounted on each side of the vehicle, each rail member mounted on the chassis of the vehicle through a mechanism for transforming two parallel, rectilinear stroke-type movements into a combined pivoting and stroke movement and vice-versa, the mechanism comprising two oppositely spaced-apart parallel guide means, two eccentric disks, each having at least a circular arc periphery portion, each eccentric disk defining a center point and an eccentric point, each eccentric disk connected to one of the parallel guide means at the eccentric point, two drive disks each having at least a circular arc periphery portion, each drive disk connected to one of the eccentric disks, the center of each drive disk coinciding with a point on the eccentric disk located diametrically opposite the eccentric point and equidistant from the center as the eccentric point, two control disks each having at least a circular arc periphery portion, each control disk attached to one of the parallel guide means, two tension means, each tension means being wound onto and extending from the periphery of one of the control disks to the drive disk on the opposite parallel guide means, two pairs of pivot bearings on each eccentric disk, one of each pair of pivot bearings being located on the center points and the other on the eccentric points, wherein the pivot bearings in the center points always have the same spacing between each other, and vertical adjustment means mounted between the chassis and the parallel guide means.

7. The undercarriage according to claim 6, wherein the vertical adjustment means is a hydraulic cylinder.

8. The undercarriage according to claim 6, comprising a fork member attached to the lower end of each parallel guide means, the eccentric disks and drive disks being mounted in the fork member.

9. The undercarriage according to claim 7, wherein the hydraulic cylinder is integrally mounted in the parallel guide means, the cylinder including a housing, the housing being guided in sleeves attached to the chassis.

10. The undercarriage according to claim 9, wherein the hydraulic cylinder includes a piston rod, the piston rod being mounted in the interior of a protective tube attached to the chassis.

11. The undercarriage according to claim 6, wherein the rail member has two parts connected to each other through a central roller-type connection, the centers of rotation of the rail part being located in the pivot bearings.

12. The undercarriage according to claim 11, wherein the roller-type connection is soft with respect to bending and stiff with respect to torsion.

13. The undercarriage according to claim 11, wherein a toothing is provided on the rail parts in the region of the roller-type connection.

14. The undercarriage according to claim 11, wherein the parts of the rail member are coupled to each other with elastic belts in the region of the roller-type connection.

15. The undercarriage according to claim 11, wherein another hydraulic cylinder extending between the two rail parts is provided in the region of the roller-type connection.

16. The carriage according to claim 11, wherein the actual centers of rotation of the roller-type connection are offset upwardly and toward the roller-type connection from the centers of the parts of the rail member.

17. The undercarriage according to claim 16, wherein the undercarriage is a crawler-type undercarriage with a chain extending over all wheels.

* * * * *